United States Patent [19]

Nakagishi

[11] Patent Number: 5,008,876
[45] Date of Patent: Apr. 16, 1991

[54] CARRIAGE LOCK APPARATUS

[75] Inventor: Toshio Nakagishi, Tokyo, Japan

[73] Assignee: Asahi Kogaku Kogyo Kabushiki Kaisha, Tokyo, Japan

[21] Appl. No.: 437,971

[22] Filed: Nov. 8, 1989

[30] Foreign Application Priority Data

Nov. 14, 1988 [JP] Japan .................. 63-287410

[51] Int. Cl.⁵ .................. G11B 17/00; G11B 17/30
[52] U.S. Cl. .................. 369/244; 369/215; 369/219; 360/104; 360/105
[58] Field of Search .................. 369/244, 215, 219; 192/148; 74/530; 360/104, 105, 106

[56] References Cited

U.S. PATENT DOCUMENTS 4,107,747 8/1978 Kumaki .................. 360/95

FOREIGN PATENT DOCUMENTS 0241775 10/1988 Japan .................. 369/244

Primary Examiner—Stuart S. Levy
Assistant Examiner—Kenneth B. Wells
Attorney, Agent, or Firm—Sandler, Greenblum & Bernstein

[57] ABSTRACT

A carriage on which a head is mounted has a rack which can be engaged with gear teeth located on a specific position. The gear teeth can be moved so as to engage with and disengage from the rack. The rack has a first pitch different from a second pitch of the gear teeth so as to maintain sure engagement.

20 Claims, 4 Drawing Sheets

CARRIAGE LOCK APPARATUS

BACKGROUND OF THE INVENTION

The present invention relates to a carriage lock apparatus which is advantageous in use in an optical disk apparatus, video disk player, compact disk player, and so on.

At the time of recording or playing back information on or from an optical disk for instance, the optical disk is rotated and a head, from which a laser beam is incident on the optical disk and through which a reflected (or transmitted) beam from the optical disk is transmitted to a photo detector, is moved in a direction of the radius of optical disk. By this movement, information can be recorded or played back on or from any track on the optical disk.

Accordingly, the head is needed to be kept in a movable state at the time of use in a radial direction of the optical disk. During nonuse times, however, if the head is movable, there is a possibility that it will collide with stoppers etc. and be damaged when an apparatus is shocked or let to accidentally fall. Therefore, generally, a carriage on which the head is mounted and which is movable in the radial direction is locked in an unmovable state at the time of nonuse.

In a conventional apparatus, the carriage is locked on a chassis by a shipping screw or by an engagement of a projection and a hole or notch which are formed on one and another of the chassis and carriage.

However, it takes a relatively long time to lock the carriage by the screw. Thus, such a system is disadvantageous when it is necessary to repeatingly lock and unlock the carriage. Furthermore, it can not be used to lock automatically.

Also, the lock method of engagement between a projection and notch limits a position for locking, namely the carriage is difficult to be locked in any radial position.

SUMMARY OF THE INVENTION

Accordingly, it is an object of the invention to eliminate the disadvantages described above.

Another object of the invention is to provide a carriage lock apparatus wherein a carriage can be automatically locked in any radial position in a simple manner.

According to this invention, there is provided a carriage lock apparatus comprising:
a head for recording or playing back information on a rotating disk;
a carriage on which the head is mounted;
first means for moving the carriage in a radial direction of the disk;
first engaging means, which has a first engaging portion with a first pitch and which moves in association with a movement of the carriage in the radial direction of disk;
second engaging means, which has a second engaging portion with a second pitch different from the first pitch and which is located in a specific position so that the second engaging portion can engage with the first engaging portion; and
second means for engaging and disengaging either the first or second engaging portions with and from another.

The carriage has the first engaging means the engaging portion of which can engage with the engaging portion of the second engaging means having the pitch different from that of the former. Accordingly, the carriage can be locked automatically in any radial position in a stable and simple manner.

DETAILED DESCRIPTION OF THE PREFERRED EMBODIMENT

FIGS. 1 to 4 illustrate a structure of a preferred embodiment of a carriage lock apparatus according to the present invention.

Figure 1:
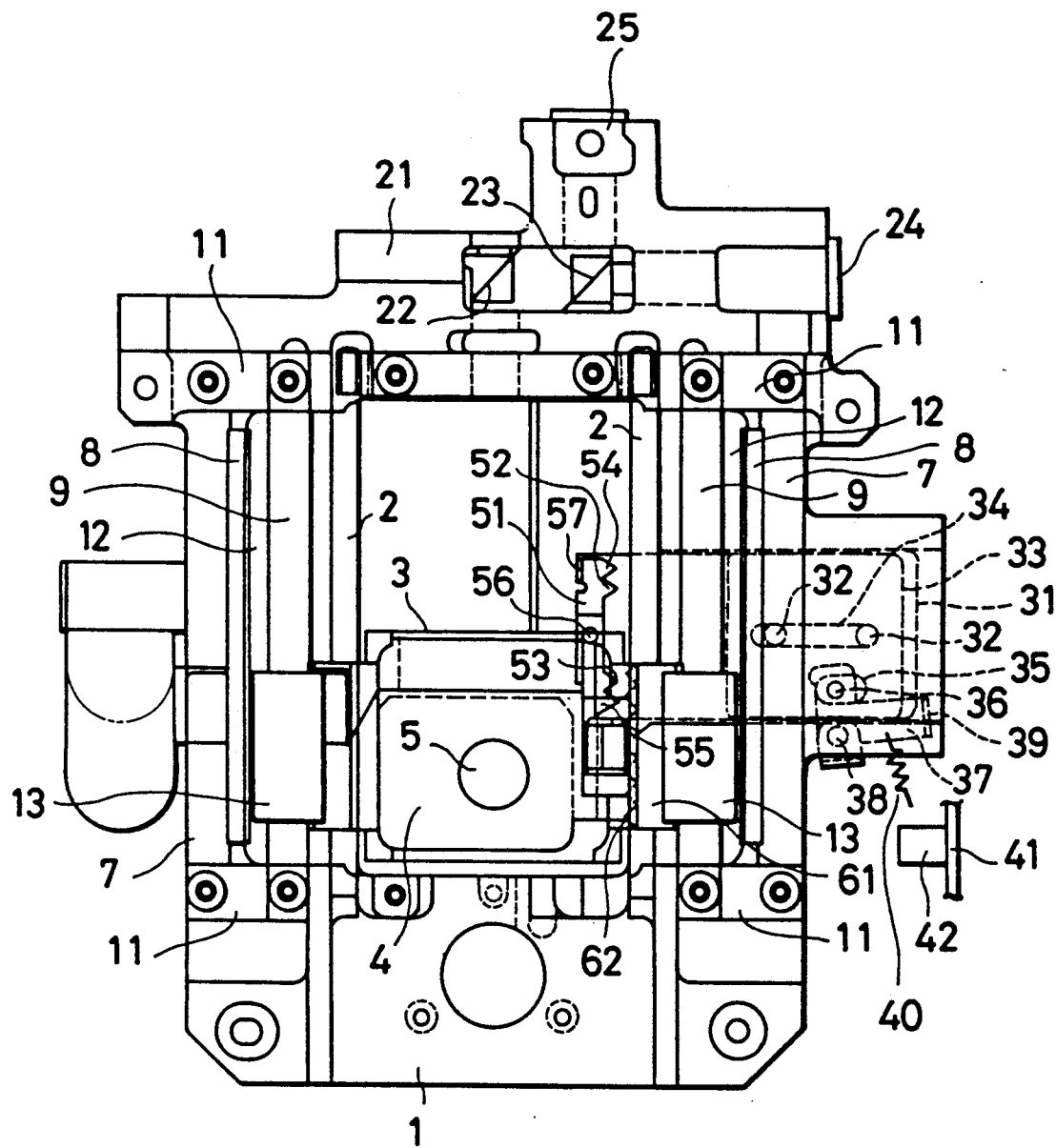
FIG. 1 is a plan view of an embodiment of carriage lock apparatus in an optical disk system according to the present invention.
Figure 2:
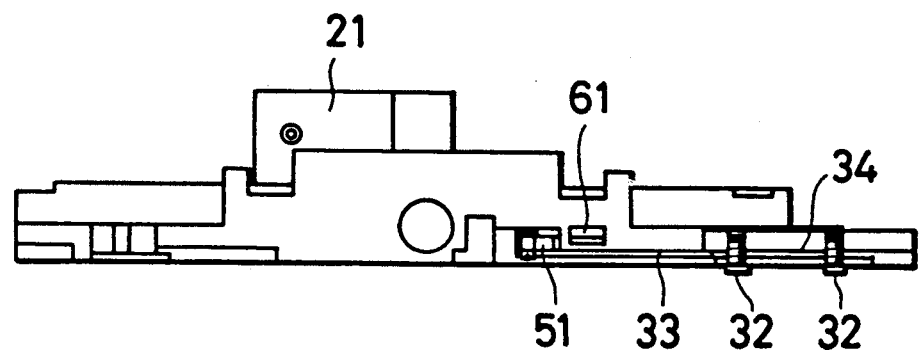
FIG. 2 is a front view of the embodiments of the carriage lock apparatus in an optical disk system of FIG. 1, wherein some parts have been omitted, for purposes of clarity
Figure 3:
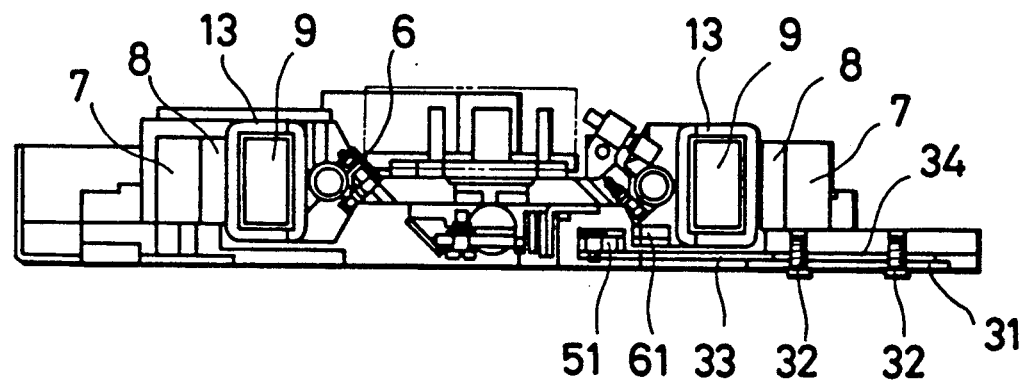
FIG. 3 is a front view of the embodiment of the carriage lock apparatus in an optical disk system of FIG. 1
Figure 4:
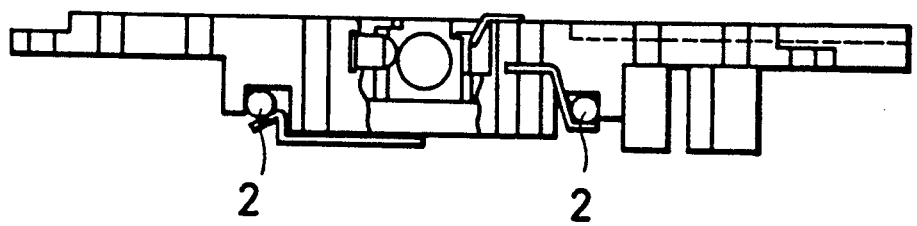
FIG. 4 is a rear view of the embodiment of the carriage lock apparatus in an optical disk system of FIG. 1

In these figures, numeral 1 is a chassis on the right and left sides of which two rods 2, each extending in a vertical direction in FIG. 1, are fixed. Numeral 3 is a carriage on which a head 4 is mounted. Head 4 includes therein an actuator (not shown) which drives an objective lens (not shown) in a focusing direction perpendicular to the drawing in FIG. 1 and a tracking direction vertical in FIG. 1. Numeral 5 designates a hole formed on head 4 through which a laser beam, radiated from optical source 21, and transmitted through the objective lens is incident on an optical disk (not shown).

Numeral 6 (FIG. 3) designates a roller which is supported on carriage 3 so as to rotate and comes in contact with rod 2 so that carriage 3 can move along rod 2 in the radial direction of the optical disk (in a vertical direction in FIG. 1). Numeral 7 is a yoke which is fixed on chassis 1 and is parallel to rod 2. On the inside of the yoke F is a magnet 8. Numeral 9 designates another yoke set on chassis 1 in parallel with yoke 7. Yokes 7 and 9 are connected at both ends thereof by another yokes 11. Numeral 12 designates a space formed between magnet 8 and yoke 9. Numeral 13 is a coil which is fixed on right and left sides of carriage 3 and in which yoke 9 is inserted.

Optical source 21, mounted on chassis 1, includes therein a semiconductor laser (not shown) which radiates a laser beam. Beam splitter 22 mounted on chassis 1, deflects the laser beam emitted from the optical source 21 to a direction of the objective lens on head 4. The laser beam which is incident on the optical disk by the objective lens and reflected by the optical disk returns in the same optical path through the objective lens. The reflected beam from the optical disk is reflected by beam splitter 22 and falls incident on a mirror, such as a half mirror 23. The laser beam is divided into two beams, each of which is incident to photo detectors 24 and 25, respectively. A tracking error signal and focusing signal are generated from outputs of the photo detectors 24 and 25, respectively. An RF signal according to the information recorded on the optical disk is derived from either the sum of the outputs of the photo detectors 24 and 25 or from just one of them.

Numeral 31 designates a plate which is fixed on the chassis 1 and on which two pins 32 are planted. Numeral 33 is a lock plate having a slot 34 in which the pins 32 are inserted. Numeral 35 is a slot which is formed on lock plate 33 and in which pin 36, fixed on lock lever 37, is inserted. Numeral 38 is a pin which is planted on chassis 1 and supports lock lever 37 so that it can rotate on pin 38. Numeral 39 designates a clinch of lock lever 37 which is pushed by clinch 42 of cam plate 41. Numeral 40 is a spring pulling lock lever 37 in a clockwise direction in FIG. 1.

Numeral 51 is a rack which has gear teeth 52 to 55 (at least two gear teeth 52 and 53) and can rotate on pin 56 planted on lock plate 33. Numeral 57 designates a stopper for limiting a rotation position of rack 51. Numeral 61 designates a rack which is mounted on carriage 3 and which has an assembly of gear teeth 62.

The operation of the apparatus will now be described.

When a cartridge (not shown), in which the optical disk is enclosed, is loaded at a specific position in the optical disk apparatus, cam plate 41 is moved by a means not shown in an upward direction in FIG. 1. When cam plate 41 reaches a specific position, clinch 42 comes in contact with clinch 39 of lock lever 37, which is pulled by spring 40 in a clockwise direction in FIG. 1. Because of the pushing of the clinch 39 by clinch 42, lock lever 37 rotates on pin 38 in a counterclockwise direction in FIG. 1, against the pulling force of the spring 40. Thus, pin 36 which is planted on lock lever 37 comes in contact with the left side of slot 35 and lock plate 33, having slot 35, is pushed to the left. Accordingly, lock plate 33 slides to the left and the movement is guided by the engagement between slot 34 formed on lock plate 33 and pin 32 planted on plate 31 and inserted in slot 34. Gear teeth 52 to 55 on the rack 51 supported on lock plate 33 through pin 56 results in the moving left and the engagement (lock) thereof with gear teeth 62 on rack 61 is removed. When the loading of the cartridge is completed, cam plate 41 is maintained in a position where clinch 39 is pressed by clinch 42 so that carriage 3 is movable.

As a magnetic flux flows in a route of magnet 8, space 12, yoke 9, yoke 11, yoke 7 and magnet 8, when an electric current flows in coil 13, an electromagnetic force is generated on a portion of coil 13 positioned in space 12 in a radial direction vertical in FIG. 1. As a result, carriage 3 and head 4 mounted thereon are linearly moved in a radial direction along rod 2, and permitting information to be recorded and played back from a track on a specific radial position of the optical disk.

Figure 5:
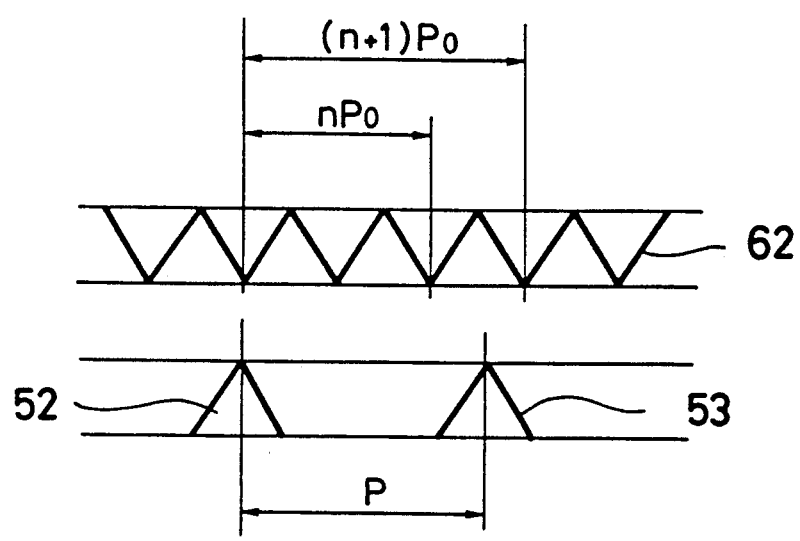

After the completion of the recording or playback operation and the cartridge is unloaded, cam plate 41 is moved down in FIG. 1 and lock lever 37 rotates on pin 38 in a clockwise direction by the force of spring 40. As pin 36, fixed on lock lever 37 results in the pressing of the right side of slot 35 formed on lock plate 33 in a right-ward direction, lock plate 33 is guided by pin 32 planted on plate 31 to move right. Accordingly, at least one of the gear teeth 52 to 55 of rack 51 engages with gear teeth 62 of rack 61, thereby locking carriage 3 so that it cannot move.

Where gear teeth 62 of rack 61 and gear teeth 52 to 55 of rack 51 have the same pitches to each other, the engagement thereof becomes difficult when these gear teeth are in such a position that the top of one gear tooth confronts with that of the top of another tooth. Therefore, in the carriage lock apparatus according to this invention, as shown in FIG. 5, when gear teeth 62 of rack 61 have a pitch $P_o$, gear teeth 52 and 53 have a pitch P different from $P_o$.

Figure 6:
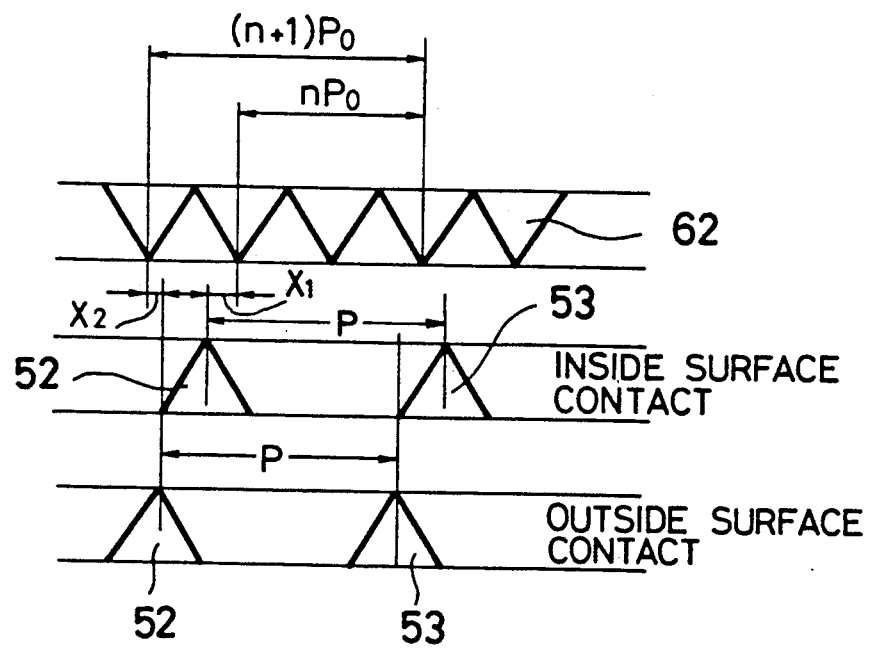
FIGS. 5 and 6 are drawings explaining pitches of gear teeth according to this invention.

FIG. 6 shows the relationship of these pitches in detail. In order to make the inside surface (right surface in FIG. 6) of gear tooth 52 (or 53) come into contact with one gear tooth 62, the following formula should be satisfied, where $X_1$ is the distance between the top of one gear tooth 52 and one gear tooth 62 and n is a positive integral number:

$$2X_1 = P - nP_o \quad (1)$$

Similarly, where $X_2$ is a distance between the top of one gear tooth 52 and one gear tooth 62, the condition to make the outside surface (left surface in FIG. 6) of gear tooth 52 (or 53) come into contact with one gear tooth 62 is as follows:

$$2X_2 = (n+1)P_o - P \quad (2)$$

When the following formula is satisfied, the engagement between these gear teeth comes to be symmetrical, wherein $$X_1 = X_2 \quad (3)$$

Therefore, the condition for symmetrical engagement is obtained by solving the equation comprising the three formulas mentioned above, as follows:

$$P = nP_o + P_o/2 \quad (4)$$

Formula (4) shows that when the pitch P in the gear teeth 52 and 53 have a phase difference against the gear teeth 62 by half of pitch $P_o$ the gear teeth 62, the symmetrical engagement is achieved. In the carriage lock apparatus according to this invention, the pitches in gear teeth 52 and 53 and 62 are set to satisfy the formula (4).

Therefore, when one of the tops of gear teeth 52 and 53 confronts with a top of one gear tooth 62, another of the tops of gear teeth 52 and 53 confronts with a bottom of gear tooth 62. As a result, rack 51 slightly rotates on pin 56 in a counterclockwise or clockwise direction at the time of engagement between gear teeth and rack 61. Namely, the carriage 3 moves a little in a vertical direction in FIG. 1 so as to absorb the difference in the gear teeth phase. Accordingly, gear teeth 52 and 53 engage with gear teeth 62.

Gear teeth 52 and 53 are located so that at least one of them engages with gear teeth 62 even if carriage 3 is in an inside or outside limit position within a radial movement range. Carriage 3 is thus able to be locked in any radial position.

Gear teeth 54 and 55 are added if necessary when it is difficult to obtain enough force to lock carriage 3 surely only by gear teeth 52 and 53. The number of gear teeth is not limited to four.

In the embodiment described above, optical source 21 is located outside of the head 4, but the former can be done inside of the latter.

Also, this invention can be applied to an apparatus wherein a head is rotated on a pivot in parallel with the disk as well as an apparatus wherein a head is moved linearly in a radial direction.

What is claimed is:

1. A carriage lock apparatus, comprising:
   a head for recording or playing back information on a rotating disk;
   a carriage on which said head is mounted;
   first means for moving said carriage in a radial direction on said disk;
   first engaging means, said first engaging means having a first engaging portion with a first pitch that moves in association with a movement of said carriage in the radial direction of said disk;
   second engaging means, said second engaging means having a second engaging portion with a second pitch that is different from said first pitch of said first engaging portion, said second engaging portion being located at a specific position so that said second engaging portion can engage said first engaging portion; and
   means for engaging or disengaging said first and second engaging portions.

2. A carriage lock apparatus according to claim 1, wherein said first engaging means is fixed on the carriage.

3. A carriage lock apparatus, comprising:
   a head for recording or playing back information on a rotating disk;
   a carriage on which said head is mounted;
   first means for moving said carriage in a radial direction on said disk;
   first engaging means, said first engaging means having a first engaging portion with a first pitch that moves in association with a movement of said carriage in the radial direction of said disk;
   second engaging means, said second engaging means having a second engaging portion with a second pitch that is different from said first pitch of said first engaging portion, said second engaging portion being located at a specific position so that said second engaging portion can engage said first engaging portion; and
   means for engaging or disengaging said first and second engaging portions, wherein one engaging portion comprises at least two gear teeth and the other engaging portion comprises a rack with gear teeth that are able to engage said at least two gear teeth.

4. A carriage lock apparatus according to claim 3, wherein said second engaging potion comprises four gear teeth and said first engaging portion comprises said rack with said gear teeth being able to engage said four gear teeth of said second engaging portion.

5. A carriage lock apparatus according to claim 1, wherein said means for engaging or disengaging comprises:
   a lock plate on which said second engaging means is fixed; and
   a lock lever which rotates and moves said lock plate so that said second engaging portion engages with and disengages from said first engaging portion.

6. A carriage lock apparatus according to claim 5, wherein said engaging or disengaging means further comprises a cam plate which is moved in association with a loading of said disk so as to rotate said lock lever.

7. A carriage lock apparatus according to claim 6, wherein said engaging or disengaging means further comprises a spring for pulling said lock lever against a drive by said cam plate.

8. A carriage lock apparatus according to claim 5, wherein said engaging or disengaging means further comprises:
   a first slot formed in said lock plate; and
   a first pin planted on said lock lever and inserted in said first slot.

9. A carriage lock apparatus according to claim 8, wherein said lock plate is mounted so as to slide by said lock lever, said engaging or disengaging means further comprising:
   a second slot formed in said lock plate; and
   at least one second pin that is inserted in said second slot so as to guide the sliding of said lock plate.

10. A carriage lock apparatus according to claim 3, wherein said gear teeth of said rack have a pitch $P_o$, as one of said first and second pitches, said two gear teeth having a pitch P as another of said first and second pitches, $X_1$ being a distance between a top of one of said two gear teeth and a top of one of said gear teeth of said rack, and n being a positive integral number, so that the following formula is satisfied:

$$2X_1 = P - nP_o.$$

11. A carriage lock apparatus according to claim 3, wherein said gear teeth of said rack have a pitch $P_o$, as one of said first and second pitches, said two gear teeth having a pitch P as another of said first and second pitches, $X_2$ being a distance between a top of one of said two gear teeth and a top of one of said gear teeth of said rack, and n being a positive integral number, so that the following formula is satisfied:

$$2X_2 = (n+1)P_o - P.$$

12. A carriage lock apparatus according to claim 3, wherein said gear teeth of said rack have a pitch $P_o$, as one of said first and second pitches, said two gear teeth having a pitch P as another of said first and second pitches, and n being a positive integral number, so that the following formula is satisfied:

$$P = nP_o + P_o/2.$$

13. A carriage lock apparatus, comprising:
    means for recording or playing back information on an information medium;
    means for supporting said recording or playback means;
    first means for moving said supporting means relative to said information medium;
    first engaging means, said first engaging means having a first engaging portion with a first pitch that moves in association with a movement of said supporting means by said first moving means;
    second engaging means, said second engaging means having a second engaging portion with a second pitch that is different from said first pitch of said first engaging portion, said second engaging portion being located at a predetermined position so that said second engaging portion can engage said first engaging portion; and
    means for engaging or disengaging said first and second engaging portions.

14. The carriage lock apparatus of claim 13, wherein said engaging or disengaging means comprises:
    a lock plate upon which said second engaging means is fixed; and
    a lock lever which rotates and moves said lock plate so that said second engaging portion engages with and disengages from said first engaging portion.

15. The carriage lock apparatus of claim 14, wherein said engaging or disengaging means comprises a cam plate that is moved in association with a loading of said information medium so as to rotate a lock lever.

16. The carriage lock apparatus of claim 13, wherein one engaging portion comprises at least two engaging teeth, and the other engaging portion comprises a rack having gear teeth that are able to engage said at least gear teeth, said gear teeth having a pitch $P_o$, as one of said first and second pitches, said two gear teeth having a pitch P as another of said first and second pitches, $X_1$ being a distance between a top of one of said two gear teeth and a top of one of said gear teeth of said rack, and n being a positive integral number, so that the following formula is satisfied:

$$2X_1 = P - nP_o.$$

17. The carriage lock apparatus of claim 13, wherein one engaging portion comprises at least two engaging teeth, and the other engaging portion comprises a rack having gear teeth that are able to engage said at least two gear teeth, said rack having a pitch $P_o$, as one of said first and second pitches, said two gear teeth having a pitch P as another of said first and second pitches, $X_2$ being a distance between a top of one of said two gear teeth and a top of one of said gear teeth of said rack, and n being a positive integral number, so that the following formula is satisfied:

$$2X_2 = (n+1)P_o - P.$$

18. The carriage lock apparatus of claim 13, wherein one engaging portion comprises at least two engaging teeth, and the other engaging portion comprises a rack having gear teeth that are able to engage said at least two gear teeth, said gear teeth of said rack having a pitch $P_o$, as one of said first and second pitches, said two gear teeth having a pitch P as another of said first and second pitches, and n being a positive integral number, so that the following formula is satisfied:

$$P = nP_o + P_o/2.$$

19. A carriage lock apparatus, comprising: means for recording or playing back information on an information medium;
   means for supporting said recording or playback means;
   first means for moving said supporting means relative to said information medium;
   a plurality of gear teeth having a first pitch that move in association with a movement of said supporting means by said first moving means;
   a rack having gear teeth of a second pitch that is different from said first pitch of said plurality of gear teeth, said gear teeth of said rack being located at a predetermined position so that said gear teeth of said rack can engage said plurality of gear teeth; and
   means for engaging or disengaging said plurality of gear teeth and gear teeth of said rack.

20. The carriage lock apparatus of claim 19, wherein said gear teeth of said rack have a pitch $P_o$, said plurality of gear teeth having a pitch P, and n being a positive integral number, so that the following formula is satisfied:

$$P = nP_o + P_o/2.$$

* * * * *

UNITED STATES PATENT AND TRADEMARK OFFICE
CERTIFICATE OF CORRECTION

PATENT NO. : 5,008,876
DATED : April 16, 1991
INVENTOR(S) : T. NAKAGISHI

It is certified that error appears in the above-identified patent and that said Letters Patent is hereby corrected as shown below:

At column 1, line 22, change "stoppers etc." to ---stoppers, etc.,---.
At column 1, line 32, change "disadvantageous" to ---advantageous---.
At column 1, line 66, after "means" insert ---,---.
At column 2, line 7, change "of carriage" to ---of a carriage---.
At column 2, line 12, delete "omitted" after ---,---.
At column 2, line 13, after "clarity" insert ---;---.
At column 2, line 15, after "FIG. 1" insert ---;---.
At column 2, line 17, after "FIG. 1" insert ---; and---.

At claim 4, line 2, change "potion" to ---portion---.

Signed and Sealed this

Seventh Day of September, 1993

Attest:

BRUCE LEHMAN

Attesting Officer

Commissioner of Patents and Trademarks